United States Patent
Moraczewski et al.

(10) Patent No.: US 8,128,845 B2
(45) Date of Patent: Mar. 6, 2012

(54) STATIC DISSIPATIVE POLYACETAL COMPOSITIONS

(75) Inventors: Jerome P. Moraczewski, Cochranville, PA (US); Joel M. Pollino, Elkton, MD (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 314 days.

(21) Appl. No.: 12/515,411

(22) PCT Filed: Nov. 5, 2007

(86) PCT No.: PCT/US2007/023289

§ 371 (c)(1), (2), (4) Date: May 19, 2009

(87) PCT Pub. No.: WO2008/066663

PCT Pub. Date: Jun. 5, 2008

(65) Prior Publication Data

US 2010/0084617 A1    Apr. 8, 2010

Related U.S. Application Data

(60) Provisional application No. 60/860,542, filed on Nov. 22, 2006.

(51) Int. Cl.
*H01B 1/06* (2006.01)
*C03C 25/26* (2006.01)
*C08G 18/80* (2006.01)

(52) U.S. Cl. ............... 252/511; 524/86; 524/593

(58) Field of Classification Search ....... 252/500–521.6, 252/511; 524/86, 593
See application file for complete search history.

(56) References Cited

U.S. PATENT DOCUMENTS

| 5,502,093 | A  | * | 3/1996  | Katsumata et al. | 524/91  |
| 6,489,388 | B1 | * | 12/2002 | Kurz et al.      | 524/432 |
| 6,753,363 | B1 | * | 6/2004  | Harashina        | 524/99  |
| 2006/0052492 | A1 | * | 3/2006 | Harashina et al. | 524/100 |
| 2007/0078204 | A1 | * | 4/2007 | Komatsu et al.   | 524/189 |

FOREIGN PATENT DOCUMENTS

| EP | 0 453 218 |   | 9/1995  |
| EP | 0 475 127 |   | 3/1996  |
| EP | 0 855 424 |   | 5/2001  |
| EP | 1 688 461 |   | 8/2006  |
| JP | 11335519 A | * | 12/1999 |
| WO | WO 2005040275 A1 | * | 5/2005 |

OTHER PUBLICATIONS

Written Opinion in corresponding International Application PCT/US2007/023290.

* cited by examiner

*Primary Examiner* — Mark Kopec
*Assistant Examiner* — Jaison Thomas
(74) *Attorney, Agent, or Firm* — Loretta F. Smith; Otha Weaver

(57) ABSTRACT

Polyacetal compositions comprising polyacetal, electroconductive carbon black, and substituted urea provide a combination of good static dissipation properties, good thermal stability during processing, and good stability to contact with fuel.

18 Claims, No Drawings

STATIC DISSIPATIVE POLYACETAL COMPOSITIONS

CROSS-REFERENCE TO RELATED APPLICATIONS

This application is a filing pursuant to 35 U.S.C. 371, which claims priority from PCT/US07/23289, filed 5 Jun. 2008, currently pending and incorporated by reference herein in its entirety and which claims priority from U.S. Provisional Application No. 60/860,542, filed 22 Nov. 2006, now expired and which is incorporated by reference herein in its entirety.

FIELD OF THE INVENTION

The present invention relates to polyacetal resin compositions having a combination of good mechanical properties, good static electricity dissipation properties, good thermal stability during processing, and good stability when exposed to fuels.

BACKGROUND OF THE INVENTION

Components used to convey fuel in motor vehicle fuel systems and other applications that require contact with fuels have traditionally been made from metals. However, it often can be desirable to make such components from polymeric materials because of their light weight and ability to be formed into intricate parts. The use of polymeric materials can provide significant flexibility in part design change, as mold designs can be altered. Polymeric materials can be formed into seamless articles that are less likely to leak than articles having seams. Polymeric materials suitable for use in fuel systems should be sufficiently electrically conductive to dissipate any static electricity that might build up and thermally stable during processing and use (as they will in many cases be used in engine compartments and other areas having elevated temperatures or be exposed to fuels having elevated temperatures). It is also desirable that a polymeric material used in a fuel system be chemically resistant to the fuels with which they come into contact.

Polyacetal (also called polyoxymethylene) resins exhibit excellent mechanical and physical properties, such as tensile strength, stiffness, as well as fatigue resistance, sliding resistance, chemical resistance, and the like. The resins are used extensively in various applications as an engineering plastic material due to their excellent physical properties (such as mechanical and electrical properties) and chemical resistance. However, conventional polyacetal compositions can degrade when exposed to certain fuels, including diesel fuels; peroxide-containing fuels; and fuels containing toluene and isoheptane, particularly at elevated temperatures. Thus conventional polyacetals must be stabilized to avoid such degradation. Many additives that can be used to stabilize polyacetal compositions to degradation caused by contact with fuels can also lead to decreased stability, and thus degradation, of the compositions during processing. Additionally, many additives that can be used to provide polyacetal compositions that are capable of dissipating static electricity (that is, render POM compositions static dissipative) can also lead to decreased stability of the compositions during processing. In addition, the use of these types of additives can deleteriously affect the physical properties of the compositions. Furthermore, stabilizer additives can migrate to the surface of molded parts, leading to blooming, which can have a deleterious affect on the surface appearance of such parts.

It would thus be desirable to obtain a static dissipative polyacetal composition having a combination of good stability upon exposure to fuels, good stability during processing, good surface appearance in molded articles, and good physical properties.

EP 0 855 424 B1 describes the use of a sterically hindered amine compound to improve the diesel fuel resistance of molded parts many from polyoxymethylenes.

SUMMARY OF THE INVENTION

In one aspect, the present invention is a polyacetal composition comprising:
(a) from about 60 to about 98.9 weight percent (wt %) of polyacetal;
(b) from about 1 to about 30 wt % of electroconductive carbon black;
(c) from about 0.1 to about 5 wt % of at least one substituted urea; and
(d) up to about 5 wt % of at least one hindered amine light stabilizer,
wherein the weight percentages are based on the total weight of (a)+(b)+(c)+(d).

In another aspect, the present invention is an article made from a polyacetal composition comprising:
(a) from about 60 to about 98.9 weight percent (wt %) of polyacetal;
(b) from about 1 to about 30 wt % of electroconductive carbon black;
(c) from about 0.1 to about 5 wt % of at least one substituted urea; and
(d) up to about 5 wt % of at least one hindered amine light stabilizer,
wherein the weight percentages are based on the total weight of (a)+(b)+(c)+(d).

In another aspect, the present invention is a film or a Sheet made from a polyacetal composition comprising:
(a) from about 60 to about 98.9 weight percent (wt %) of polyacetal;
(b) from about 1 to about 30 wt % of electroconductive carbon black;
(c) from about 0.1 to about 5 wt % of at least one substituted urea; and
(d) up to about 5 wt % of at least one hindered amine light stabilizer,
wherein the weight percentages are based on the total weight of (a)+(b)+(c)+(d).

DETAILED DESCRIPTION OF THE INVENTION

In one embodiment, the present invention is a polyacetal composition capable of dissipating static electricity (hereinafter a "static dissipative" polyacetal composition), said composition comprising: (a) from about 60 to about 98.9 weight percent (wt %) of polyacetal; (b) from about 1 to about 30 wt % of electroconductive carbon black; (c) from about 0.1 to about 5 wt % of at least one substituted urea; and, optionally, (d) from about 0 to about 5 wt % of at least one hindered amine light stabilizer. More preferably the static dissipative polyacetal composition of the present invention comprises from about 79 to about 96.8 wt % of the polyacetal, from about 3 to about 15 wt % of the electroconductive carbon black, from about 0.2 to about 3 wt % of the at least one substituted urea, and from about 0 to about 3 wt % of the at least one hindered amine light stabilizer. Even more preferably the static dissipative polyacetal composition comprises from about 87.5 to about 95.8 wt % of polyacetal; from about 4 to about 9 wt % of the electroconductive carbon black; from about 0.2 to about 1.5 wt % of the at least one substituted urea; and from about 0 to about 2 wt % of the at least one hindered amine light stabilizer, wherein the weight percentages are based on the total weight of (a)+(b)+(c)+(d).

When the at least one hindered amine light stabilizer is present, the compositions of the present invention preferably comprise from about 0.1 to about 5 wt %, more preferably from about 0.2 to about 3 wt % and even more preferably from about 0.2 to about 2 wt % of the at least one hindered amine light stabilizer, based on the total weight of (a)+(b)+(c)+(d).

The polyacetal (also possibly referred to as "polyoxymethylene" or "POM") suitable for use in the practice of the present invention can be one or more homopolymers, copolymers, or mixtures thereof. Polyacetals useful in the present invention are preferably copolymers or blends obtained from mixing two or more copolymers. Homopolymers can be prepared by polymerizing formaldehyde and/or formaldehyde equivalents, such as cyclic oligomers of formaldehyde. In a preferred embodiment the homopolymers have terminal hydroxyl groups end-capped by a chemical reaction with a second reactant. The type of reactant useful in the practice of the present invention can be any that is known or conventional for reacting with hydroxyl groups, but it can be preferred to form ester or ether linkages as terminal-, or end-groups. Preferred end-groups for homopolymers used in the present invention are acetate or methoxy groups.

Polyacetal copolymers can be derived from reaction of one or more known and conventionally used comonomers with formaldehyde and/or formaldehyde equivalents. Comonomers useful herein can be selected from acetals and cyclic ethers having from 2-12 sequential carbon atoms. By sequential, it is meant that the carbon atoms are linked in sequence to each other with no intervening heteroatom(s). Copolymers useful in the practice of the present invention comprise not more than 20 wt %, preferably not more than 15 wt %, and most preferably about 2 wt % comonomers, based on the weight of the polyacetal copolymer. Preferable comonomers are selected from: 1,3-dioxolane; ethylene oxide; and butylene oxide. Preferred polyacetal copolymers comprise about 2 wt % 1,3-dioxolane. For copolymers, it can be preferable to have some free hydroxy ends from the comonomer unit or terminal ether groups. Preferred terminal groups for copolymers are hydroxyl (—OH) and methoxy (—OCH$_3$).

The polyacetal used in the compositions of the present invention can be branched or linear and will preferably have a number average molecular weight of at least 10,000, and preferably about 20,000 to about 90,000. The molecular weight can be conveniently measured by gel permeation chromatography in m-cresol at 160° C. using a DuPont PSM bimodal column kit with nominal pore size of 60 and 1000 Angstroms (Å). The molecular weight can also be measured by determining the melt flow using ASTM D1238 or ISO 1133. The melt flow will preferably be in the range of 0.1 to 100 g/min, more preferably from 0.5 to 60 g/min, or yet more preferably from 0.8 to 40 g/min. for injection molding purposes.

Static dissipative polyacetal compositions of the present invention comprise electroconductive carbon black. Electroconductive carbon blacks suitable for use in the practice of the present invention comprise, for example, superconductive furnace black, conductive furnace black, extra conductive furnace black, super abrasion furnace black. It is preferable that the electroconductive carbon black have a specific surface area of at least about 700 m$^2$/g and an oil absorption of from 2 to 4 mL/g. Suitable electroconductive carbon blacks include Ketjenblack® products supplies by Akzo Nobel.

The compositions of the present invention preferably have a surface resistivity of no greater than about 1×10$^6$ Ωsq and, more preferably, have a surface resistivity of about 1×10$^2$ to about 1×10$^6$ Ωsq as measured using ASTM D257.

The substituted ureas used in the composition have the structure (R$^1$)(R$^2$)N—(CO)—N(R$^3$)(R$^4$), wherein R$^1$ is a hydrocarbon group and wherein R$^2$, R$^3$, and R$^4$ each independently may be a hydrogen atom or a hydrocarbon group. The hydrocarbon group may optionally comprise heteroatom substituents. Preferred hydrocarbon groups include alkyl; alicyclic; unsaturated linear, branched, or cyclic hydrocarbon; and aryl groups. Saturated hydrocarbon groups are more preferred. In one preferred embodiment, monosubstituted ureas are used (that is, R$^2$, R$^3$, and R$^4$ are H). Preferred hydrocarbon groups include sec-butyl; tent-butyl; ethyl; methyl; butyl; cyclohexyl; phenyl; propyl, benzyl; tolyl; and allyl. Preferred alkyl groups include sec-butyl; tert-butyl; ethyl; methyl; isobutyl; n-butyl; and propyl. Two or more substituted ureas may be used. Examples of heteroatoms or groups suitable for substitution include, but are not limited to: O, N, Cl, Br, F, ester groups.

The compositions may optionally further comprise at least one hindered amine light stabilizer (HALS). Preferred HALS are compounds of the following general formulas and combinations thereof:

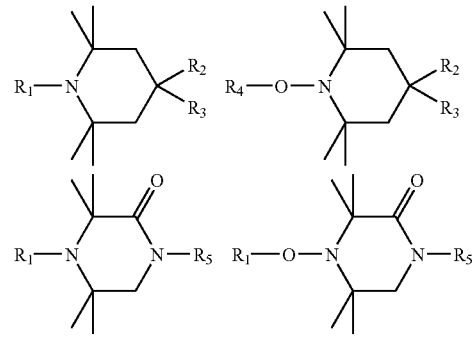

Referring to the general formula above, $R_1$, $R_2$, $R_3$, $R_4$, and $R_5$ can be independent and distinct substituents. For example, $R_1$, $R_2$, $R_3$, $R_4$, and $R_5$ can be hydrogen or comprise functionality independently selected from: ether groups, ester groups, amine groups, amide groups, alkyl groups, alkenyl groups, alkynyl groups, aralkyl groups, cycloalkyl groups and aryl groups, in which the substituents in turn may contain functional groups; examples of functional groups are alcohols, ketones, anhydrides, imines, siloxanes, ethers, carboxyl groups, aldehydes, esters, amides, imides, amines, nitriles, ethers, urethanes and any combination thereof. A hindered amine light stabilizer may also form part of a polymer or oligomer.

Preferably, the HALS is a compound derived from a substituted piperidine compound. In particular, the HALS is preferably any compound derived from an alkyl-substituted piperidyl, piperidinyl or piperazinone compound, and substituted alkoxypiperidinyl compounds.

Preferred HALS contain triazine moieties having at least one secondary amine component, or residue, as illustrated in structure 1. Examples include Chimassorb® 944 (poly[[6-[(1,1,3,33-tetramethylbutyl)amino]-1,3,5-triazine-2,4-diyl] [(2,2,6,6-tetramethyl-4-peperidinyl)-imino]-1,6-hexanediyl [(2,2,6,6-tetramethyl-4-piperidinyl)imino]]), supplied by Ciba Specialty Chemicals.

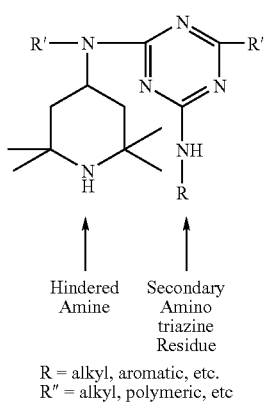

Structure 1

R = alkyl, aromatic, etc.
R'' = alkyl, polymeric, etc

The compositions of the present invention may further comprise optional additives, provided that such additives are included in amounts that do not have a substantial negative impact on the desirable characteristics or properties of the compositions, such that the composition becomes unsuitable for its intended use. Examples of such additives include: impact modifiers in an amount of up to about 40 wt %, preferably from about 10 to about 40 wt %; lubricants in an amount of up to about 1 wt %, preferably from about 0.1 to about 1 wt %; up to about 5 wt % of plasticizer, preferably from about 0.5 to about 5 wt %; antioxidants in an amount up to about 2 wt %, preferably from about 0.01 to about 2 wt %; fillers in an amount of up to about 40 wt %, preferably from about 3 to about 40 wt %; reinforcing agents in an amount of up to about 40 wt %, preferably in an amount of from about 1 to about 40 wt %; nanoparticles such as nanoclays in an amount of up to about 10 wt %, preferably in an amount of from about 0.5 to about 10 wt %; ultraviolet light stabilizers in an amount of up to about 2 wt %, preferably in an amount of from about 0.05 to about 2 wt %; and nucleating agents in an amount of up to about 3 wt %, preferably from about 0.05 to about 3 wt %; wherein the phrase "up to about" denotes a range that is inclusive of a lower limit of 0 wt %, and all weight percentages are based on the total weight of the composition.

The polyacetal compositions of the present invention are made by melt-blending the components using any known or conventional methods. The component materials may be mixed thoroughly using a melt-mixer such as a single or twin-screw extruder, blender, kneader, Banbury mixer, etc. to give a resin composition. Or, part of the materials may be mixed in a melt-mixer, and the rest of the materials may then be added and further thoroughly melt-mixed.

The compositions of the present invention can be molded into articles using any suitable melt-processing technique. Commonly used melt-molding methods known in the art such as injection molding, extrusion molding, blow molding, and injection blow molding are preferred and injection molding is more preferred. The compositions of the present invention can be formed into sheets and both cast and blown films by extrusion. These films and sheets may be further thermoformed into articles and structures that can be oriented from the melt or at a later stage in the processing of the composition.

Examples of articles that may be made from the compositions of the present invention include conveyer system parts; automotive system components (such as modules, fuel pumps, fuel filler necks, and the like); and medical devices such as surgical tools and applications where electrical equipment is used.

EXAMPLES

The Examples and Comparative Examples are provided for illustrative purposes only. The following procedures were used in the examples and comparative examples:

Mechanical Properties

Mechanical properties of the various compositions were measured on test specimens prepared by injection molding. The test pieces were type I tensile bars having a thickness of 3.2 mm, a width of 13 mm in the necked down portion, and a length of 165 mm. Tensile strength and elongation were measured using ASTM D-638 procedures. The results are reported in the tables. Higher tensile and elongation in a polymer specimen typically indicate superior mechanical properties.

Surface Resistivity

Surface resistivity measurements of the various compositions were measured using an ETS model 880 point-to-point resistance meter by Electro-Tech systems. The ETS 880 has a measurement range of $10^3$-$10^{12}$ ohms with an accuracy of ±10%. The results for this test are reported in the tables in Ωsq under "surface resistivity". The compositions preferably have a surface resistivity of about $1 \times 10^2$ to about $1 \times 10^6$ ohm/square (Ωsq).

Thermal Stability

In the following examples, thermal stability of the compositions was evaluated using two different testing methods. In either method, higher loss indicates greater instability of the polymer at the test conditions.

Thermogravimetric Analysis (TGA) was performed under nitrogen using a TA TGA-2950 instrument and all samples were ramped at 50° C./min from room temperature to 230° C. and were held isothermally at this temperature for 30 min. The results are reported in the tables below under the heading of "TGA weight loss".

(b) Formaldehyde Index (FORI) was determined using the following procedure. A weighed sample of the polyacetal composition to be tested was placed in a tube and the tube was fitted with a cap for introduction of nitrogen to the test sample and for the removal of any evolved gases from the apparatus while maintaining the sample in an oxygen-free environment. The sample was heated at 230° C. in a silicon oil bath. The nitrogen and any evolved gases were transported and bubbled through 75 mL of an aqueous 40 g/L sodium sulfite solution. Any evolved formaldehyde reacts with the sodium sulfite to liberate sodium hydroxide. The sodium hydroxide was continuously neutralized with standard 0.1N HCl. The results were obtained as a chart of mL of titer versus test time. The percent evolved formaldehyde was calculated by the formula $$(V)(N)[0.03 \times 100/SW]$$

Where
V is the volume of titer in milliliters
N is the normality of the titer
SW is the sample weight in grams
The factor "0.03" is the milliequivalent weight of formaldehyde in g/milliequivalent.

FORI results are reported after thirty minutes of heating. The results are reported in the tables under the heading of FORI (% loss).

Fuel Resistance

In the following examples, the fuel resistance of the various compositions was measured in the following manner. A flask equipped with a reflux condenser was filled with various fuel types. A type I testing bar was pre-weighed, immersed in the flask containing fuel, heated to a specific temperature, and allowed to soak for 21 days. At set time intervals of 168 h, 336 h, and 504 h the test specimen was removed, dried, and weighed. The percentage change between the initial weight and weight after fuel exposure at each time interval was recorded (% change). Three different fuel types and temperatures were investigated (the components of the fuels used for testing are given in volume percentages):

CP fuel is comprised of toluene (49.6%), isooctane (49.6%), t-butyl peroxide (0.72%, a 70% solution in water), and copper chloride (0.03%, 0.0052 g of CuCl in 1 L of water). CP fuel testing was carried out at a temperature of 60° C. The results for this test are reported in the tables under CP fuel (% change)

(b) TF2 fuel is comprised of toluene (46.3%), isooctane (46.3%), methyl alcohol (5.0%), and ethyl alcohol (2.5%). TF2 fuel testing was carried out at a temperature of 82° C. The results are reported in the tables under TF2 fuel (% change).

(c) Diesel fuel was purchased from Halternan products. CEC reference fuel 73-A93 batch 8 was used. Diesel fuel testing was carried out at a temperature of 100° C. The results are reported in the tables under diesel fuel (% changes).

Sample Preparation

Samples were prepared by melt compounding the component ingredients using one of the following methods:

(a) "Extrusion A" was carried out on a 30 mm Werner and Pfleiderer twin screw co-rotating extruder (Bilobal Design) at a temperature of about 190° C., a screw speed of about 200 rpm, and a head pressure of about 20-60 psi. The resulting extrudates were quenched in a water bath and pelletized. The pellets were subsequently oven dried and injection molded into test specimens.

(b) "Extrusion B" was conducted on a DSM Xplore® 15-cc Micro Compounder twin screw co-rotating extruder at a temperature of about 200° C., a screw speed of about 100 rpm, a hold time of about 5 min, and a head pressure of about 20-60 psi. The resulting molten extrudates were directly injection molded into test specimens using the DSM Micro Explor® apparatus.

(c) "Extrusion C" was carried out on a 40 mm Werner and Pfleiderer twin screw co-rotating extruder (Bilobal Design) at a temperature of about 190-200° C., a screw speed of about 225 rpm, and a head pressure of about 20-40 psi. The resulting extrudates were quenched in a water bath and pelletized. The pellets were subsequently oven dried and injection molded into test specimens.

Components

The following components were used in the compositions of the examples and comparative examples:

Polyacetal A: is a polyoxymethylene copolymer of molecular weight greater than 70,000 such as Delrin® 460, or Delrin® 560 polyacetal copolymers commercially supplied by E. I. du Pont de Nemours and Company, or Tenac®-C 4520, a polyacetal copolymer commercially supplied by Asahi. Delrin® 460 and Tenac®-C 4520 have melt-flow rates of 9 grams/10 minutes [190 Deg C., 2.16 kg weight], and Delrin® 560 has a melt-flow rate of 14 grams/10 minutes [190 Deg C., 2.16 kg weight].

Polyacetal B: Delrin® 560, a polyacetal copolymer supplied by E. I. du Pont de Nemours and Company.

Electroconductive carbon black: Ketjenblack EC300J (supplied by Akzo Nobel)

Polyamide: Elvamide® 8063, a polyamide 6,6/6,10/6 terpolymer supplied by E. I. du Pont de Nemours and Company.

Poly(ethylene/vinyl alcohol): Ground Soarnol® A supplied by Marubeni America Corp.

HALS A: Chimassorb® 944 (poly[[6-[(1,1,3,33-tetramethylbutyl)amino]-1,3,5-triazine-2,4-diyl][(2,2,6,6-tetramethyl-4-peperidinyl)-imino]-1,6-hexanediyl [(2,2,6,6-tetramethyl-4-piperidinyl)imino]]), supplied by Ciba Specialty Chemicals.

HALS B: Chimassorb® 119 (1,3,5-triazine-2,4,6-triamine, N,N'''-[1,2-ethanediylbis [[[4,6-bis[butyl (1,2,2,6,6-pentamethyl-4-piperidinyl)amino]-1,3,5-triazine-2-yl] imino]-3,1-propanediyl]]-bis[N',N''-dibutyl-N',N''-bis(1,2,2,6,6-pentamethyl-4-piperidinyl)), supplied by Ciba Specialty Chemicals.

HALS C: Cyasorb® UV 3346 (N-butyl-2,2,6,6-tetramethyl-4-piperidinamine; 2,2'-[(2,2,6,6-tetramethyl-piperidinyl)-imino]-bis-[ethanol]; poly((6-morpholine -S-triazine-2,4-diyl)(2,2,6,6-tetramethyl-4-piperidinyl)-iminohexamethylene-(2,2,6,6-tetramethyl-4-piperidinyl)-imino)) supplied by Cytec Technology Corp.

HALS D: Tinuvin® 622 (oligomer of N-(2-hydroxyethyl)-2,2,6,6-tetramethyl-4-piperidinol and succinic acid), supplied by Ciba Specialty Chemicals.

HALS E: Tinuvin® 144, supplied by Ciba Specialty Chemicals.

Hvcite® 713: A magnesium/aluminium-hydrotalcite stabilizer supplied by Ciba Specialty Chemicals.

DHT-4A: A magnesium aluminum hydroxide carbonate supplied by Kyowa Chemical Industry Co., Ltd.

Irganox® 1035: A hindered phenolic stabilizer supplied by Ciba Specialty Chemicals.

Irganox® 245: A hindered phenolic stabilizer supplied by Ciba Specialty Chemicals.

Irganox® 168: A stabilizer supplied by Ciba Specialty Chemicals.

Tinuvin® 328: A triazine stabilizer supplied by Ciba Specialty Chemicals.

Examples 1-3 and Comparative Examples 1-9

The compositions of Examples 1 to 3 and Comparative Examples 1 to 9 were prepared by melt-blending in an extruder using extrusion method A. The compositions comprised about 6.5 wt % electroconductive carbon black; 3 wt % of a hydroxy-substituted hydrocarbon wax; 0.2 wt % Irganox® 245FF (supplied by Ciba Specialty Chemicals); 1 wt % glycerol monostearate; and the stabilizer additives specified in Table 1 in the amounts specified in Table 1, where the balance of the composition comprised polyacetal A, such that the total of the weight percentages was 100 percent.

TABLE 1

| | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|---|
| Stabilizer additive (wt. %): | | | | | | | | | | | | |
| Melamine | — | — | — | — | 0.5 | 1 | — | — | — | — | — | — |
| Polyamide | — | — | — | — | — | — | 0.5 | 1 | — | — | — | — |
| Poly(ethylene/vinyl alcohol) | — | — | — | — | — | — | — | — | 0.5 | 1 | — | — |
| Sec-butyl urea | 0.5 | 1 | 0.5 | — | — | — | — | — | — | — | — | — |
| HALS A | — | — | 1 | — | — | — | — | — | — | — | 0.5 | 1 |
| TGA weight loss (%) | 5.3 | 3.1 | 3.6 | 74 | 6 | 6.7 | 6.7 | 7.5 | 71.8 | 51.1 | 7.1 | 6.7 |
| Tensile strength (psi) | 7490 | 6980 | 6780 | 6800 | 7060 | 6210 | 5790 | 6430 | 6090 | 6160 | 7030 | 6290 |
| Elongation at break (%) | 15.3 | 15.9 | 9 | 5.8 | 7.8 | 2.1 | 2 | 3.9 | 2.4 | 3.9 | 9.2 | 4.2 |

Amounts of stabilizers are given in weight percentage based on the total weight of the composition.

Example 4 and Comparative Examples 10-17

The compositions of Example 4 and Comparative Examples 10 to 17 were prepared using extrusion method A by melt-blending polyacetal A (88.5 wt %), carbon black (6.5 wt %), 4 wt % of a hydroxy-substituted hydrocarbon wax, and the stabilizer additives specified in Table 2. Each composition was tested for surface resistivity, TGA weight loss, FORI, percent elongation at break, and tensile strength. The results are given in Table 2. Test specimens molded from the composition of Comparative Example 11 exhibited a whitish surface and blooming (whitish deposit on the surface of the article that appears after heating for 90° C. for an hour). This effect was not observed in the cases of Example 4.

TABLE 2

| | Ex. 4 | Comp. Ex. 10 | Comp. Ex. 11 | Comp. Ex. 12 | Comp. Ex. 13 | Comp. Ex. 14 | Comp. Ex. 15 | Comp. Ex. 16 | Comp. Ex. 17 |
|---|---|---|---|---|---|---|---|---|---|
| Stabilizer additive (wt. %): | | | | | | | | | |
| Melamine | — | — | 1 | — | — | — | — | — | — |
| Hycite ® 713 | — | — | — | 1 | — | — | — | — | — |
| DHT-4A | — | — | — | — | 1 | — | — | — | — |
| HALS A | — | — | — | — | — | 1 | — | — | — |
| Irganox ® 1035 | — | — | — | — | — | — | 1 | — | — |
| HALS C | — | — | — | — | — | — | — | 1 | — |
| Allantoin | — | — | — | — | — | — | — | — | 1 |
| n-Butyl urea | 1 | — | — | — | — | — | — | — | — |
| Surface resistivity (Ω sq) | 1 × 10³ | — | 1 × 10³ | 1 × 10³ | 1 × 10³ | 1 × 10³ | 1 × 10³ | 1 × 10³ | 1 × 10³ |
| FORI (% loss) | 0.54 | >8 | >8 | >8 | >8 | >8 | >8 | >8 | >8 |
| TGA weight loss (%) | 4 | 84 | 29 | 73 | 43 | 13 | 71 | 40 | 9 |
| Tensile strength (psi) | 7440 | 7680 | 7500 | 7650 | 7620 | 7000 | 7270 | 7520 | 7670 |
| Elongation at break (%) | 22.2 | 10.2 | 8.3 | 9.2 | 9.5 | 7.2 | 8.2 | 17 | 13 |

Amounts of stabilizers are given in weight percentage based on the total weight of the composition.

Example 5 and Comparative Examples 18-20

The compositions of Example 5 and Comparative Examples 18 to 20 were prepared using extrusion method A by melt-blending polyacetal (88.6 wt %), carbon black (6.5 wt %), 4 wt % of a hydroxy-substituted hydrocarbon wax, and the stabilizer additives specified in Table 3. Each composition was tested for TF2 and CP fuel resistance. The results are given in Table 3.

TABLE 3

| | Ex. 5 | Comp. Ex. 18 | Comp. Ex. 19 | Comp. Ex. 20 |
|---|---|---|---|---|
| Stabilizer additive (wt. %): | | | | |
| Melamine | — | 1 | — | — |
| HALS A | — | — | 1 | — |
| Allantoin | — | — | — | 1 |
| n-Butyl urea | 1 | — | — | — |
| TF2 fuel (% change) | | | | |
| 168 h | 2.7 | 3.1 | 3.1 | 2.7 |
| 336 h | 1.7 | 2.8 | 3.1 | 2.8 |
| 504 h | 2.4 | 3 | 3.1 | 2.5 |
| CP fuel (% change) | | | | |
| 168 h | 1.6 | 1.7 | 2.5 | 1.5 |
| 336 h | −1.1 | −1 | 1.8 | −1.4 |
| 504 h | −5.9 | −5.4 | 0.7 | −5.4 |

Amounts of stabilizers are given in weight percentage based on the total weight of the composition.

Example 6 and Comparative Examples 21-23

The compositions of Example 6 and Comparative Examples 21 to 23 were prepared using extrusion method C by melt-blending polyacetal A (4.9 wt %), carbon black (6.5 wt %), 4 wt % of a hydroxy-substituted hydrocarbon wax, 1 wt % glycerol monostearate, 0.2 wt % of antioxidants, 2 wt % of calcium carbonate, 0.1 wt % of cyanoguanidine, and the stabilizer additives specified in Table 4, where the balance of the composition comprised polyacetal B, such that the total of the weight percentages was 100 percent. Each composition was tested for diesel fuel resistance. The results are given in Table 4.

Examples 7 and 8 and Comparative Examples 24-29

The compositions of Examples 7 and 8 and Comparative Examples 24 to 29 were prepared using extrusion method A by melt-blending carbon black (6.5 wt %), 4 wt % of a hydroxy-substituted hydrocarbon wax, antioxidants (0.2 wt %), 1 weigh percent of glycerol monostearate, and the stabilizer additives specified in Table 5 where the balance of the composition comprised polyacetal A, such that the total of the weight percentages was 100 percent. Each composition was tested for surface resistivity, TGA weight loss, percent elongation at break, tensile strength, and CP fuel resistivity. The results are given in Table 5.

TABLE 5

| | Ex. 7 | Ex. 8 | Comp. Ex. 21 | Comp. Ex. 22 | Comp. Ex. 23 | Comp. Ex. 24 | Comp. Ex. 25 | Comp. Ex. 26 | Comp. Ex. 27 | Comp. Ex. 28 | Comp. Ex. 29 |
|---|---|---|---|---|---|---|---|---|---|---|---|
| Stabilizer additive (wt. %): | | | | | | | | | | | |
| Melamine | — | — | — | 1 | — | — | — | — | — | — | — |
| Irganox ® 245 | — | — | — | — | 1 | — | — | — | — | — | — |
| Irgafos ® 168 | — | — | — | — | — | 1 | — | — | — | — | — |
| HALS D | — | — | — | — | — | — | 1 | — | — | — | — |
| HALS E | — | — | — | — | — | — | — | 1 | — | — | — |
| HALS C | — | — | — | — | — | — | — | — | 1 | — | — |
| Tinuvin ® 328 | — | — | — | — | — | — | — | — | — | 1 | — |
| HALS A | — | — | — | — | — | — | — | — | — | — | 1 |
| HALS B | — | — | — | — | — | — | — | — | — | — | — |
| n-Butyl urea | — | 1 | — | — | — | — | — | — | — | — | — |
| Methyl urea | 1 | — | — | — | — | — | — | — | — | — | — |
| Surface resistivity ($\Omega$ sq) | $1 \times 10^3$ to $1 \times 10^4$ | $1 \times 10^3$ to $1 \times 10^4$ | $1 \times 10^{14}$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ |
| TGA weight loss (%) | 6.4 | 4.1 | 81.3 | 24.1 | 63.1 | 70 | 17.5 | 15 | 58.3 | 11.2 | 13.1 |
| Tensile strength (psi) | 7470 | 7340 | 7710 | 7600 | 7040 | 7460 | 7400 | 7460 | 6660 | 7030 | 6980 |
| Elongation at break (%) | 23 | 20.7 | 25.6 | 26.9 | 10.6 | 11.5 | 10.7 | 9.6 | 5.2 | 5.8 | 8 |
| CP fuel (% change) | | | | | | | | | | | |
| 168 h | 0.9 | 0.8 | 0.8 | 1.2 | 1.9 | 0.7 | 1.4 | 1.3 | 1 | 2.3 | 2.1 |
| 336 h | −2.5 | −3 | −2.4 | −0.6 | −1.7 | −3.4 | −1.2 | −0.8 | −2 | 1.4 | 1.2 |
| 504 h | −8.3 | −7.7 | −7.6 | −2.5 | −5.3 | −8.7 | −3.4 | −3 | −4.6 | 0.7 | 0.2 |

Amounts of stabilizers are given in weight percentage based on the total weight of the composition.

TABLE 4

| | Ex. 6 | Comp. Ex. 21 | Comp. Ex. 22 | Comp. Ex. 23 |
|---|---|---|---|---|
| Stabilizer additive (wt. %): | | | | |
| Melamine | — | — | 1 | — |
| HALS A | — | — | — | 1 |
| n-Butyl urea | 1 | — | — | — |
| Diesel fuel (% change) | | | | |
| 168 h | 0.8 | 0.7 | 0.7 | 0.4 |
| 336 h | −10.5 | −7.9 | 1 | −24.2 |
| 504 h | −19.7 | −24.8 | 0.9 | −40.3 |

Amounts of stabilizers are given in weight percentage based on the total weight of the composition.

Examples 9-11 and Comparative Examples 30-32

The compositions of Examples 9 to 11 and Comparative Examples 30 to 32 were prepared using extrusion method A by melt-blending carbon black (6.5 wt %), 4 wt % of a hydroxy-substituted hydrocarbon wax, 1 wt % glycerol monostearate, 0.2 wt % of antioxidants, and the stabilizer additives specified in Table 6, where the balance of the composition comprised polyacetal A, such that the total of the weight percentages was 100 percent. Each composition was tested for surface resistivity, TGA weight loss, percent elongation at break, tensile strength, and CP fuel resistivity. The results are given in Table 6.

TABLE 6

| | Ex. 9 | Ex. 10 | Ex. 11 | Comp. Ex. 30 | Comp. Ex. 31 | Comp. Ex. 32 |
|---|---|---|---|---|---|---|
| Stabilizer additive (wt. %): | | | | | | |
| HALS A | — | — | 1 | — | — | — |
| HALS B | — | 1 | — | — | 1 | — |
| Methyl urea | 1 | 1 | 1 | — | — | 1 |
| Surface resistivity ($\Omega$ sq) | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ |
| TGA weight loss (%) | 6.4 | 4.3 | 4.3 | 81.3 | 11.2 | 13.1 |
| Tensile strength (psi) | 7470 | 6870 | 6930 | 7710 | 7030 | 6980 |
| Elongation at break (%) | 23 | 13.9 | 12.1 | 25.6 | 5.8 | 8 |

TABLE 6-continued

|  | Ex. 9 | Ex. 10 | Ex. 11 | Comp. Ex. 30 | Comp. Ex. 31 | Comp. Ex. 32 |
|---|---|---|---|---|---|---|
| CP fuel (% change) | | | | | | |
| 168 h | 0.9 | 1.6 | 1.7 | 0.8 | 2.3 | 2.1 |
| 336 h | -2.5 | 0.3 | 0.5 | -2.4 | 1.4 | 1.2 |
| 504 h | -8.3 | -1 | -0.6 | -7.6 | 0.7 | 0.2 |

Amounts of stabilizers are given in weight percentage based on the total weight of the composition.

Examples 12-16 and Comparative Examples 33 and 34

The compositions of Examples 12 to 16 and Comparative Examples 33 and 34 were prepared using extrusion method A by melt-blending carbon black (6.5 wt %), 4 wt % of a hydroxy-substituted hydrocarbon wax, 1 wt % glycerol monostearate, 0.2 wt % of antioxidants, and the stabilizer additives specified in Table 7, where the balance of the composition comprised polyacetal A, such that the total of the weight percentages was 100 percent. Each composition was tested for surface resistivity, TGA weight loss, FORI, percent elongation at break, tensile strength, and CP fuel resistivity. The results are given in Table 7.

TABLE 7

|  | Ex. 12 | Ex. 13 | Ex. 14 | Ex. 15 | Ex. 16 | Comp. Ex. 33 | Comp. Ex. 34 |
|---|---|---|---|---|---|---|---|
| Stabilizer additive (wt. %): | | | | | | | |
| Melamine | — | — | — | — | — | 1 | — |
| Urea | — | — | — | — | — | — | 1 |
| HALS A | 1 | 1 | 1 | 1 | 1 | 1 | 1 |
| Ethyl urea | 1 | — | — | — | — | — | — |
| n-Propyl urea | — | 1 | — | — | — | — | — |
| n-Butyl urea | — | — | 1 | — | — | — | — |
| Sec-butyl urea | — | — | — | 1 | — | — | — |
| Tert-butyl urea | — | — | — | — | 1 | — | — |
| Surface resistivity (R (Ω sq)) | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ |
| TGA weight loss (%) | 3.8 | 3.9 | 3.6 | 3.9 | 3 | 3.5 | 4.6 |
| FORI (%) | 0.2 | 0.1 | 0.1 | 0.1 | 1.0 | 0.8 | 0.5 |
| Tensile strength (psi) | 7180 | 7000 | 6900 | 7100 | 7260 | 7730 | 7120 |
| Elongation at break (%) | 6 | 7.2 | 14.1 | 18 | 3.8 | 8.4 | 10.8 |
| CP fuel (% change) | | | | | | | |
| 168 h | 1.8 | 2.1 | 2.2 | 2.4 | 2 | 2.6 | 2.1 |
| 336 h | 0.7 | 1.1 | 1.5 | 1.7 | 1.4 | 2.2 | 1.6 |
| 504 h | 0.3 | 0.2 | 1 | 1.4 | -0.5 | 2.3 | 1.2 |

Amounts of stabilizers are given in weight percentage based on the total weight of the composition.

Examples 17-27 and Comparative Examples 35-40

The compositions of Examples 17 to 27 and Comparative Examples 35 to 40 were prepared using extrusion method A by melt-blending carbon black (6.5 wt %), 4 wt % of a hydroxy-substituted hydrocarbon wax, 1 wt % glycerol monostearate, 0.2 wt % of antioxidants, and the stabilizer additives specified in Tables 8 and 9, where the balance of the composition comprised polyacetal A, such that the total of the weight percentages was 100 percent. Each composition was tested for surface resistivity, TGA weight loss, FORI, percent elongation at break, tensile strength, and CP fuel resistivity. The results are given in Tables 8 and 9.

TABLE 8

|  | Ex. 17 | Ex. 18 | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|---|---|
| Stabilizer additive (wt. %): | | | | | | | | | | | |
| HALS A | 0.5 | 1 | 1.5 | 2 | 0.5 | 1 | 1.5 | 2 | — | — | — |
| Sec-butyl urea | 0.5 | 0.5 | 0.5 | 0.5 | 1 | 1 | 1 | 1 | 0.5 | 1 | 1.5 |
| Surface resistivity (Ω sq) | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ |
| TGA weight loss (%) | 2.8 | 2.9 | 3.2 | 3.6 | 3.3 | 3.5 | 3.7 | 3.5 | 3.6 | 3.9 | 4 |
| FORI (%) | 0.3 | 0.2 | 0.1 | 0.3 | 0.1 | 0.1 | 0.1 | 0.1 | 0.4 | 0.2 | 0.2 |
| Tensile strength (psi) | 7490 | 7400 | 7400 | 7270 | 7430 | 7300 | 7300 | 7200 | 7500 | 7300 | 7240 |
| Elongation at break (%) | 20.1 | 16.5 | 17.1 | 10.8 | 17.9 | 14 | 10.9 | 8.8 | 17.7 | 20.9 | 17.2 |

TABLE 8-continued

|  | Ex. 17 | Ex. 18 | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|---|---|
| CP fuel (% change) | | | | | | | | | | | |
| 168 h | 2.1 | 2.4 | 2.2 | 2.3 | 2.3 | 2.3 | 2.2 | 2.3 | 2.3 | 2.3 | 2.3 |
| 336 h | 1.9 | 2.2 | 2.5 | 2.6 | 1.7 | 2 | 2.2 | 2.3 | 0.4 | −0.2 | −0.2 |
| 504 h | 1 | 1.5 | 2.1 | 2.1 | 0.5 | 1.1 | 1.2 | 1.9 | −2.5 | −3.8 | −4.7 |

Amounts of stabilizers are given in weight percentage based on the total weight of the composition.

TABLE 9

|  | Comp. Ex. 35 | Comp. Ex. 36 | Comp. Ex. 37 | Comp. Ex. 38 | Comp. Ex. 39 | Comp. Ex. 40 |
|---|---|---|---|---|---|---|
| Stabilizer additive (wt. %): | | | | | | |
| HALS A | — | 0.25 | 0.5 | 1 | 1.5 | 2 |
| Sec-butyl urea | — | — | — | — | — | — |
| Surface resistivity (R ($\Omega$ sq)) | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ | $1 \times 10^3$ to $1 \times 10^4$ |
| TGA weight loss (%) | 49.2 | 24.3 | 24.8 | 6.1 | 5.9 | 4.6 |
| FORI (%) | >8.4 | >8.4 | >8.4 | 5.1 | 2.7 | 1.4 |
| Tensile strength (psi) | 7570 | 7670 | 7570 | 7470 | 7440 | 7130 |
| Elongation at break (%) | 18.8 | 16.4 | 16.2 | 12.6 | 11.4 | 11.4 |
| CP fuel (% change) | | | | | | |
| 168 h | 2 | 2 | 2.2 | 2.2 | 2.2 | 2.3 |
| 336 h | 0.2 | 2.1 | 1.9 | 2.4 | 2.6 | 2.7 |
| 504 h | −3.3 | 1 | 0.8 | 2 | 2.1 | 2.2 |

Amounts of stabilizers are given in weight percentage based on the total weight of the composition.

What is claimed is:

1. A polyacetal composition comprising:
   (a) from about 60 to about 98.9 weight percent (wt %) of polyacetal;
   (b) from about 1 to about 30 wt % of electroconductive carbon black;
   (c) from about 0.1 to about 5 wt % of at least one substituted urea having the structure:

$(R^1)(R^2)N—(CO)—N(R^3)(R^4)$, wherein $R^1$ is a C3-C4 linear or branched hydrocarbon group and $R^2$, $R^3$, and $R^4$ are H; and
   (d) up to about 5 wt % of at least one hindered amine light stabilizer, wherein the weight percentages are based on the total weight of (a)+(b)+(c)+(d).

2. The polyacetal composition of claim 1, wherein polyacetal (a) comprises at least one polyvoxymethylene copolymer.

3. The composition of claim 1, comprising about 79 to about 96.8 wt % (a); about 3 to about 15 wt % (b); about 0.2 to about 3 wt % (c); and 0 to about 3 wt % (d).

4. The composition of claim 1, comprising about 87.5 to about 95.8 wt % (a); about 4 to about 9 wt % (b); about 0.2 to about 1.5 wt % (c); and 0 to about 2 wt % (d).

5. The composition of claim 1, wherein the composition has a surface resistivity of no greater than about $1 \times 10^6$ $\Omega$sq as measured using ATSM D257.

6. The composition of claim 1, wherein the composition has a surface resistivity of about $1 \times 10^2$ to about $1 \times 10^6$ $\Omega$sq as measured using ATSM D257.

7. The composition of claim 1, wherein substituted urea (c) is n-butyl urea.

8. The composition of claim 1, wherein (c) is at least one substituted urea selected from the group consisting of sec-butyl urea; tent-butyl urea; ethyl urea; methyl urea; iso-butyl urea; n-butyl urea; propyl urea; cyclohexyl urea; phenyl urea; benzyl urea; tolyl urea; and allyl urea.

9. The composition of claim 1, wherein (d) comprises at least one triazine moiety having at least one secondary amine component.

10. The composition of claim 1, wherein (d) is poly[[6-[(1,1,3,33-tetramethylbutyl) amino]-1,3,5-triazine-2,4-diyl][(2,2,6,6-tetramethyl-4-peperidinyl)-imino]-1,6-hexanediyl [(2,2,6,6-tetramethyl-4-piperidinyl)imino]].

11. The composition of claim 1 further comprising at least one additive that performs at least one of the following functions: impact modifier, lubricant, plasticizer, antioxidant, filler, reinforcing agent, light stabilizer, or nucleating agent.

12. The composition of claim 1 further comprising nanoparticles.

13. An article made from the composition of claim 1.

14. The article of claim 13 wherein the article is used in a system to convey fuel.

15. The article of claim 13 wherein the article is useful as an automotive fuel system component.

16. The article of claim 15 wherein the fuel system component is a module, a fuel pump, or a fuel filler neck.

17. A film or sheet made from the composition of claim 1.

18. The polyacetal of claim 1 wherein the polyacetal composition does not contain a tent-butyl urea and wherein the polyacetal composition has a formaldehyde index that is at least 30% less than the same polyacetal composition without a substituted urea.

* * * * *

UNITED STATES PATENT AND TRADEMARK OFFICE
CERTIFICATE OF CORRECTION

| | | |
|---|---|---|
| PATENT NO. | : 8,128,845 B2 | Page 1 of 1 |
| APPLICATION NO. | : 12/515411 | |
| DATED | : March 6, 2012 | |
| INVENTOR(S) | : Jerome P. Moraczewski et al. | |

It is certified that error appears in the above-identified patent and that said Letters Patent is hereby corrected as shown below:

Column 15, line 58 (claim 5, line 3)
"ATSM" should read -- ASTM --.

Column 15, line 61 (claim 6, line 3)
"ATSM" should read -- ASTM --.

Signed and Sealed this
First Day of May, 2012

David J. Kappos
*Director of the United States Patent and Trademark Office*